（12）United States Patent
Levitan et al.

(10) Patent No.: US 7,877,586 B2
(45) Date of Patent: Jan. 25, 2011

(54) BRANCH TARGET ADDRESS CACHE SELECTIVELY APPLYING A DELAYED HIT

(75) Inventors: David S. Levitan, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/024,190

(22) Filed: Feb. 1, 2008

(65) Prior Publication Data

US 2009/0198982 A1 Aug. 6, 2009

(51) Int. Cl.
G06F 9/32 (2006.01)
G06F 9/42 (2006.01)

(52) U.S. Cl. .................................. 712/234; 712/240

(58) Field of Classification Search ................ 712/234, 712/239, 240
See application file for complete search history.

(56) References Cited

U.S. PATENT DOCUMENTS

| 5,414,822 | A | * | 5/1995 | Saito et al. ................ 712/240 |
| 6,279,105 | B1 | | 8/2001 | Konigsburg et al. |
| 6,353,882 | B1 | | 3/2002 | Hunt |
| 6,484,256 | B1 | | 11/2002 | Levitan et al. |
| 6,516,409 | B1 | | 2/2003 | Sato |
| 6,523,110 | B1 | * | 2/2003 | Bright et al. ............... 712/239 |
| 6,611,910 | B2 | | 8/2003 | Sharangpani et al. |
| 6,792,521 | B2 | * | 9/2004 | Arimilli et al. ............. 711/203 |
| 6,823,447 | B2 | | 11/2004 | Hay et al. |
| 7,624,254 | B2 | * | 11/2009 | Smith et al. ................ 712/216 |
| 2002/0178349 | A1 | | 11/2002 | Shibayama et al. |
| 2002/0199092 | A1 | | 12/2002 | Henry et al. |
| 2005/0027967 | A1 | | 2/2005 | Sperber et al. |
| 2005/0091475 | A1 | | 4/2005 | Sodami |
| 2005/0262332 | A1 | | 11/2005 | Rappoport et al. |
| 2006/0174096 | A1 | | 8/2006 | Konigsburg et al. |
| 2006/0221960 | A1 | | 10/2006 | Borgione |
| 2006/0236080 | A1 | | 10/2006 | Doing et al. |
| 2007/0033318 | A1 | | 2/2007 | Gilday et al. |

FOREIGN PATENT DOCUMENTS

EP 462587 12/1991

OTHER PUBLICATIONS

Levitan et al.; "Data Processing System, Processor and Method of Data Processing Having Improved Branch Target Address Cache"; U.S. Appl. No. 11/837,893, filed Aug. 13, 2007.

(Continued)

*Primary Examiner*—Daniel Pan
(74) *Attorney, Agent, or Firm*—Dillon & Yudell LLP

(57) ABSTRACT

In at least one embodiment, a processor includes at least one execution unit that executes instructions and instruction sequencing logic, coupled to the at least one execution unit, that fetches instructions from a memory system for execution by the at least one execution unit. The instruction sequencing logic including branch target address prediction circuitry that stores a branch target address prediction associating a first instruction fetch address with a branch target address to be used as a second instruction fetch address. The branch target address prediction circuitry includes delay logic that, in response to at least a tag portion of a third instruction fetch address matching the first instruction fetch address, delays access to the memory system utilizing the second instruction fetch address if no branch target address prediction was made in an immediately previous cycle of operation.

13 Claims, 6 Drawing Sheets

OTHER PUBLICATIONS

Bradford et al.; "Data Processing System, Processor and Method of Data Processing Having Improved Branch Target Address Cache"; U.S. Appl. No. 11/561,002, filed Nov. 17, 2006.

Eberly Jr. et al.; "The Correlation Branch Target Address Cache"; IBM TDB, vol. 36, No. 5, pp. 83-86, May 1996.

Eickenmeyer; "Improving Instruction Cache Branch Prediction with Target Addresses"; IBM TDB, vol. 36, No. 7, pp. 497-498, Jul. 1993.

* cited by examiner

BTAC 300

| IFA | BTA |
|---|---|
| A | A |
| B | B |

*Figure 3A*
Prior Art

| Cycle | ICA | BScan | BPred |
|---|---|---|---|
| 1 | A | | |
| 2 | A+20h | A | |
| 3 | A+40h | A+20h | A |
| 4 | B | | |
| 5 | B+20h | B | |
| 6 | B+40h | B+20h | B |
| 7 | A | | |
| 8 | A+20h | A | |
| 9 | A | A+20h | A |
| 10 | B | | |
| 11 | B+20h | B | |
| 12 | B | B+20h | B |
| 13 | A | | |
| 14 | A+20h | A | |
| 15 | A | A+20h | A |

*Figure 3B*
Prior Art

No BTAC prediction; sequential fetch → (cycle 8)

Correct prediction squashed because preceding fetch incorrect → (cycles 12, 15)

BTAC Array 140

*Figure 5A*

| IFA | BTA |
|---|---|
| A | A |
| B | B |

*Figure 5B*

| Cycle | ICA | BScan | BPred |
|---|---|---|---|
| 1 | A | | |
| 2 | ~~A+20h~~ | A | |
| 3 | ~~A+40h~~ | ~~A+20h~~ | A |
| 4 | B | | |
| 5 | ~~B+20h~~ | B | |
| 6 | ~~B+40h~~ | ~~B+20h~~ | B |
| 7 | A | | |
| 8 | ~~A+20h~~ | A | |
| 9 | delayed | ~~A+20h~~ | A |
| 10 | B | | |
| 11 | A | B | |
| 12 | B | A | B |
| 13 | A | B | A |
| 14 | B | A | B |
| 15 | A | B | A |

BRANCH TARGET ADDRESS CACHE SELECTIVELY APPLYING A DELAYED HIT

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, to branch prediction. Still more particularly, the present invention relates to a data processing system, processor and method of data processing with an improved branch target address cache (BTAC).

2. Description of the Related Art

A state-of-the-art microprocessor can comprise, for example, a cache for storing instructions and data, an instruction sequencing unit for fetching instructions from the cache, ordering the fetched instructions, and dispatching the fetched instructions for execution, one or more sequential instruction execution units for processing sequential instructions, and a branch processing unit (BPU) for processing branch instructions.

Branch instructions processed by the BPU can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bit(s) or the value of a counter.

Conditional branch instructions can be further classified as either resolved or unresolved based upon whether or not the condition upon which the branch depends is available when the conditional branch instruction is evaluated by the BPU. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively predict the outcomes of unresolved branch instructions as taken or not taken. Utilizing the result of the prediction, the instruction sequencing unit is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or utilizing dynamic branch prediction, which predicts resolutions of branch instructions by reference to branch history accumulated on a per-address basis within a branch history table (BHT) and/or branch target address cache (BTAC).

Modem microprocessors require multiple cycles to fetch instructions from the instruction cache, scan the fetched instructions for branches, and predict the outcome of unresolved conditional branch instructions. If any branch is predicted as taken, instruction fetch is redirected to the new, predicted address. This process of changing which instructions are being fetched is called "instruction fetch redirect". During the several cycles required for the instruction fetch, branch scan, and instruction fetch redirect, instructions continue to be fetched along the not taken path; in the case of a predicted-taken branch, the instructions within the predicted-taken path are discarded, resulting in decreased performance and wasted power dissipation.

Several existing approaches are utilized to reduce or to eliminate the instruction fetch redirect penalty. One commonly used method is the implementation of a BTAC that in each entry caches the branch target address of a taken branch in association with the branch instruction's tag. In operation, the BTAC is accessed in parallel with the instruction cache and is searched for an entry whose instruction tag matches the fetch address transmitted to the instruction cache. If such a BTAC entry exists, instruction fetch is redirected to the branch target address provided in the matching BTAC entry. Because the BTAC access typically takes fewer cycles than the instruction fetch, branch scan, and taken branch redirect sequence, a correct BTAC prediction can improve performance by causing instruction fetch to begin at a new address sooner than if there were no BTAC present.

However, in conventional designs, the BTAC access still generally requires multiple cycles, meaning that in the case of a BTAC hit at least one cycle elapses before the taken branch redirect. The interval between the BTAC access and the instruction fetch redirect represents a "bubble" during which no useful work is performed by the instruction fetch pipeline. Unfortunately, this interval tends to grow as processors achieve higher and higher operating frequencies and as BTAC sizes increase in response to the larger total number of instructions (i.e., "instruction footprint") of newer software applications.

SUMMARY OF THE INVENTION

In at least one embodiment, a processor includes at least one execution unit that executes instructions and instruction sequencing logic, coupled to the at least one execution unit, that fetches instructions from a memory system for execution by the at least one execution unit. The instruction sequencing logic including branch target address prediction circuitry that stores a branch target address prediction associating a first instruction fetch address with a branch target address to be used as a second instruction fetch address. The branch target address prediction circuitry includes delay logic that, in response to at least a tag portion of a third instruction fetch address matching the first instruction fetch address, delays access to the memory system utilizing the second instruction fetch address if no branch target address prediction was made in an immediately previous cycle of operation.

BRIEF DESCRIPTION OF THE DRAWINGS

FIG. 3A is a view of the contents of a conventional two-cycle BTAC;

FIG. 3B depicts a chart of the operation over 15 processor cycles of the instruction fetch pipeline of a prior art processor with a conventional two-cycle BTAC in the presence of a tight instruction loop;

FIG. 5A is a view of the contents of a two-cycle BTAC in accordance with the present invention;

FIG. 5B depicts a chart of the operation over 15 processor cycles of the instruction fetch pipeline of a processor with a two-cycle BTAC in the presence of a tight instruction loop in accordance with the present invention.

DETAILED DESCRIPTION OF ILLUSTRATIVE EMBODIMENT

Figure 1:
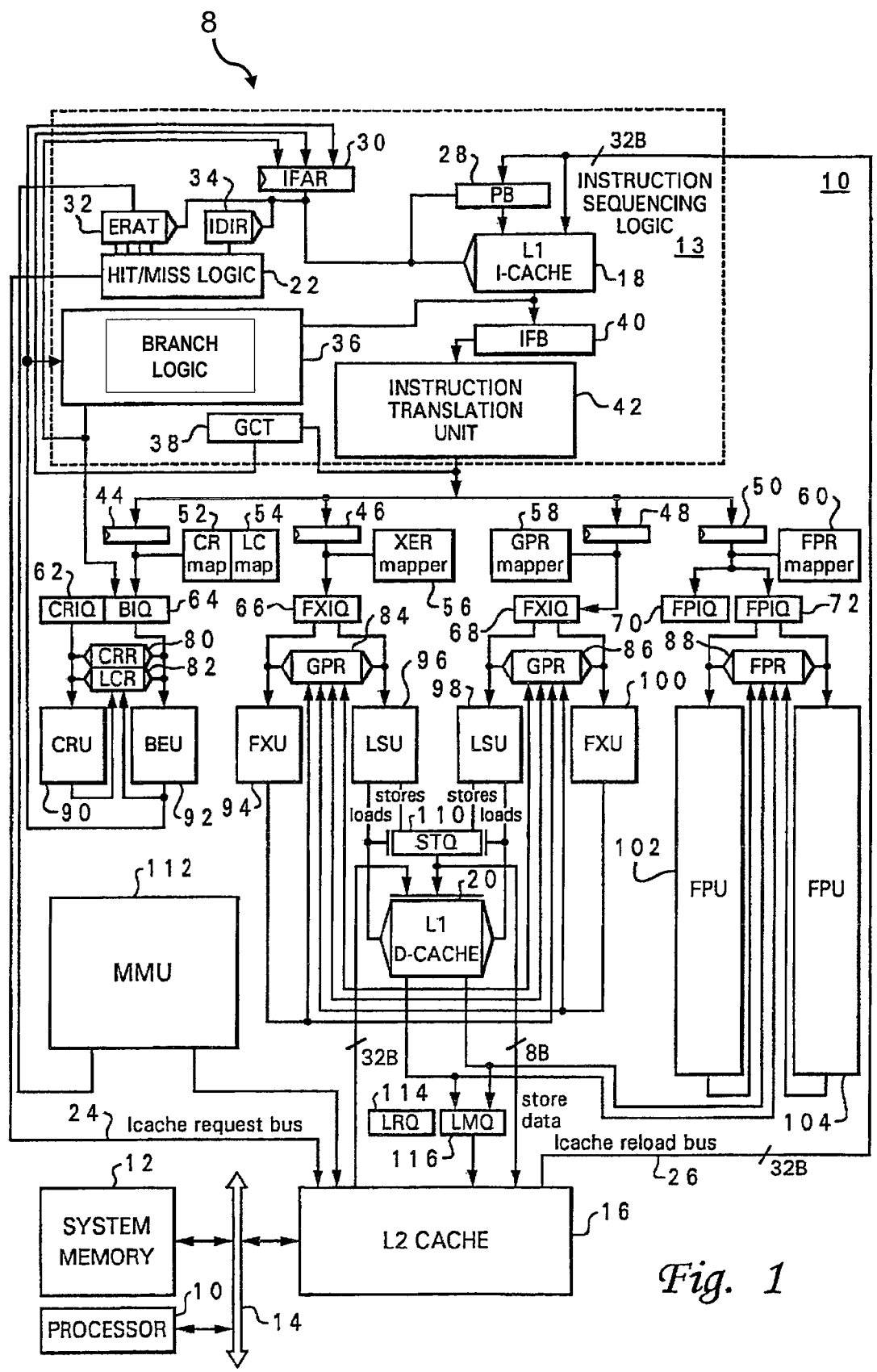
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 maybe coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a block of instructions (e.g., a 32-byte cache line) to be fetched from L1 I-cache 18 for processing. During each cycle, a new instruction fetch address (IFA) may be loaded into IFAR 30 from one of at least three sources: branch logic 36, which provides speculative branch target addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the block of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the block of instructions specified by the EA in IFAR 30 resides in L1 cache 18, L1 I-cache 18 outputs the block of instructions to both branch logic 36 and to instruction fetch buffer (IFB) 40. As described further below with respect to FIG. 2, branch logic 36 scans the block of instructions for branch instructions and predicts the outcome of conditional branch instructions in the instruction block, if any. Following a branch prediction, branch logic 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the block of instructions received from L1 I-cache 18 until the block of instructions can be translated, if necessary, by an instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. In some embodiments, the instructions are also maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by branch logic 36. If the path addresses match, branch logic 36 updates its prediction facilities, if necessary. If, however, the calculated path address does not match the predicted path address, BEU 92 supplies the correct path address to IFAR 30, and branch logic 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2:
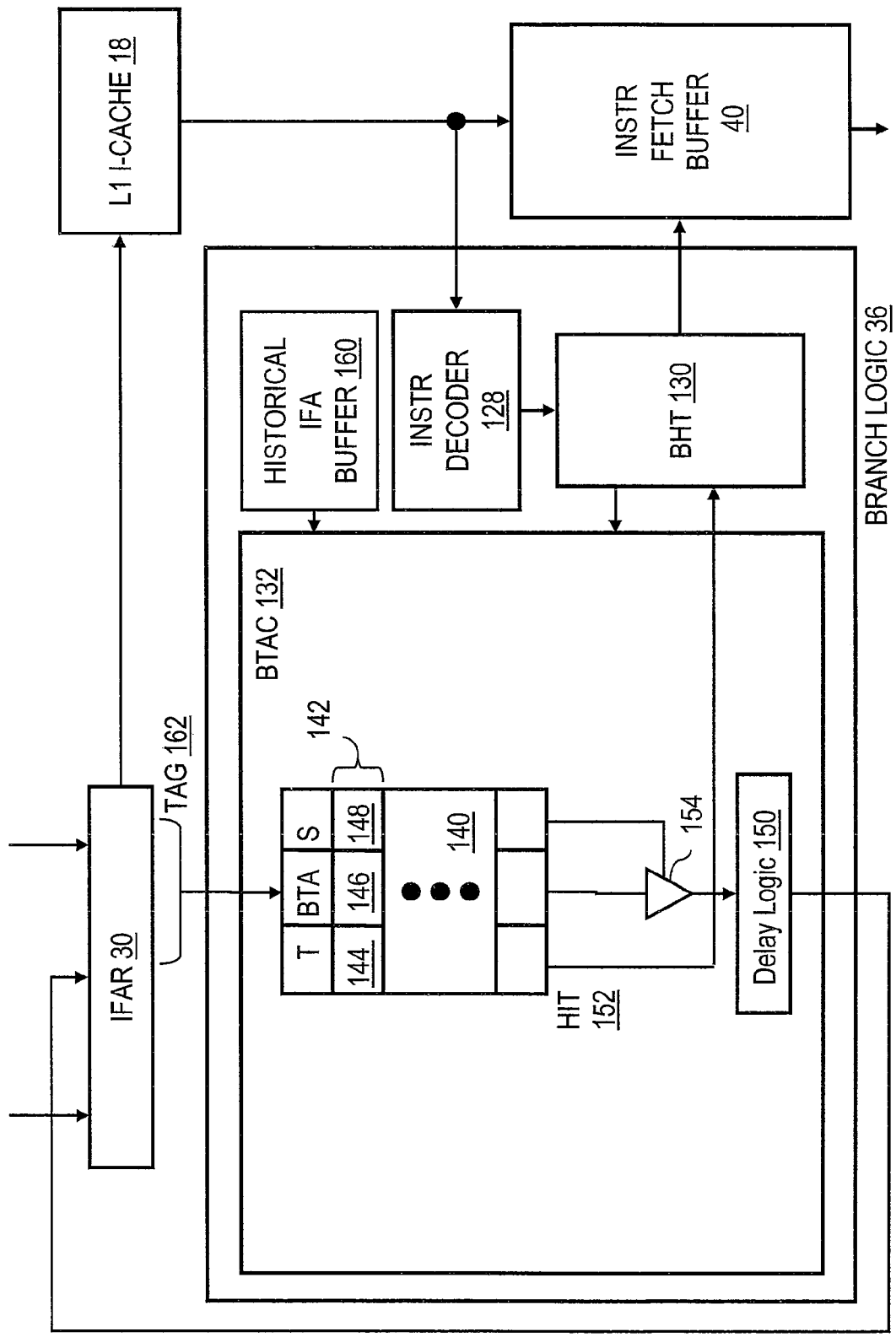
FIG. 2 is a more detailed block diagram of the branch logic within the data processing system of FIG. 1.

Referring now to FIG. 2, there is depicted a more detailed block diagram of an exemplary embodiment of branch logic 36 of FIG. 1 in relation to other components of instruction sequencing logic 13. In the illustrated embodiment, branch logic 36 includes a historical instruction fetch address (IFA) buffer 160 that buffers one or more previous values of IFAR 30 (if available), an instruction decoder 128, branch direction prediction circuitry, such as branch history table (BHT) 130, and branch target address prediction circuitry, such as branch target address cache (BTAC) 132. In alternative embodiments of the present invention, the branch direction prediction circuitry can be implemented utilizing any other type of branch direction prediction circuitry, including without limitation, static branch prediction circuitry or two-level dynamic branch prediction circuitry. In addition, the branch target address prediction circuitry can also be implemented utilizing other known or future developed branch target address prediction circuitry, such as a branch target buffer (BTB). Further, in some embodiments, the physical structures utilized for branch direction prediction and branch target address prediction may be merged. The present invention is equally applicable to all such embodiments.

Instruction decoder 128 is coupled to receive each cache line of instructions as it is fetched from L1 I-cache 18 and placed in instruction fetch buffer 40. Instruction decoder 128 scans each cache line of instructions for branch instructions, and in response to detecting a branch instruction, forwards the branch instruction to the branch direction prediction circuitry (e.g., BHT 130) for direction prediction. As further indicated by the connection between BHT 130 and instruction fetch buffer 40, in the event BTAC 132 invokes fetching along a path that BHT 130 predicts as not-taken, BHT 130 cancels the instructions in the incorrect path from instruction fetch buffer 40 and redirects fetching along the correct path.

In accordance with the present invention, the branch target address prediction circuitry (hereinafter, referred to as BTAC 132) includes a BTAC array 140 that has an N-cycle access latency (e.g., two cycles) and that stores addresses of instruction blocks to be fetched N processor clock cycle later. For example, in embodiments in which N=2, BTAC array 140 stores address of instruction blocks to be fetched in the processor clock cycle following fetching of the next instruction block. Thus, for the instruction address sequence 0x100, 0x120, 0x200, BTAC array 140 would store an entry associating instruction address 0x100 with predicted branch target address 0x200.

In the depicted embodiment, BTAC array 140 includes multiple entries 142, each including a tag (T) field 144 for storing a tag portion of an instruction fetch address (IFA), a branch target address (BTA) field 146 for storing a BTA, and a state (S) field 148 indicating state information for the entry 142. In various embodiments, state field 148 may simply indicate validity of its entry 142 or may alternatively or additionally provide additional information, such as the type of entry and/or a score indicating a confidence in the correctness of the BTA.

In operation, BTAC array 140 is accessed by the tag 162 of the IFA in IFAR 30 in parallel with the access to L1 I-cache 18 to make determine whether or not it should send a new IFA to IFAR 30. If tag 162 of the IFA in IFAR 30 does not match the contents of any tag field 144 of any valid entry 142 in BTAC array 140, BTAC array 140 deasserts its hit signal 152. If, on the other hand, tag 162 matches the contents of a tag field 144 of a valid entry 142 of BTAC array 140, BTAC array 140 asserts hit signal 152 and outputs the BTA associated with the matching tag field 144. The BTA is qualified at a first buffer 154 by the state information within the state field 148 of the matching entry 142, and if successfully qualified, is presented to IFAR 30 for selection, possibly after application of a delay by delay logic 150 as described below with reference to FIG. 4.

BTAC 132 is updated, as needed, when branch prediction is performed. As shown, BTAC array 140 passes hit signal 152 to the branch direction prediction circuitry (e.g., BHT 130). If the result of the branch direction prediction is not an instruction fetch redirect (i.e., the branch is predicted as not taken) and branch instruction tag 162 hit in BTAC array 140, BHT 130 sends an invalidation request to remove the incorrect branch target address prediction from BTAC array 140. Alternatively, if the result of the branch direction prediction is an instruction fetch redirect and branch instruction tag 162 missed in BTAC array 140, BHT 130 sends an insertion request to BTAC array 140 to request insertion of a new entry 142 if the IFA immediately preceding the IFA of the predicted branch is buffered in historical IFA buffer 160 when the insertion request is generated. Further details regarding the operation of BTAC 132 are described below with reference to FIGS. 3-7.

In BTACs with multi-cycle access latency, inefficiency can arise in the presence of code containing consecutive taken branches. In particular, with conventional BTACs, the failure to correctly predict one branch in a sequence of instructions can cause an instruction block fetched as a result of the correct prediction of a subsequent branch to be flushed along with the erroneously fetched instruction block.

For example, consider an instruction sequence exhibiting a tight loop structure alternating between the 32-byte instruction blocks at addresses A and B as follows: A, B, A, B, etc. For this pattern, a conventional BTAC 300 with 2-cycle latency would eventually be loaded with the branch target address predictions depicted in FIG. 3A. As shown, a first entry in BTAC 300 associates the IFA A with the BTA A, and a second entry associates the IFA B with the BTA B.

FIG. 3B is a chart summarizing the processing of the exemplary instruction fetch address sequence A, B, A, B, etc. in a conventional processor employing 2-cycle BTAC 300 of FIG. 3B to provide branch target addresses for instruction fetching. In the chart, the progress of IFAs through the stages of an instruction fetch pipeline, namely, instruction cache access (ICA), branch scan (BScan) and branch prediction (BPred), is shown across 15 processor clock cycles of operation.

In cycle 1, the instruction sequence begins, and IFA A is utilized to access the instruction cache. In cycle 2, IFA A proceeds to the branch scan stage, and in the absence of a BTA prediction by BTAC 300, the instruction cache is accessed with the sequential IFA A+20h, where "20h" represents length of a 32-byte instruction block expressed in hexadecimal. In cycle 3, the IFA A proceeds to the branch prediction stage, IFA A+20h proceeds to the branch scan stage, and in the absence of a BTA prediction, the instruction cache is accessed with the sequential IFA A+40h. Because there is inadequate history, no prediction for IFA A is yet entered into BTAC 300.

Next, in cycle 4, IFA B is computed, and erroneous IFAs A+20h and A+40h are canceled from the instruction fetch pipeline. In cycles 5-6, the process described above with reference to cycles 2-3 is repeated for IFA B and sequential IFAs B+20h and B+40h. Next, in cycle 7, IFA A is computed, and erroneous IFAs B+20h and B+40h are canceled from the instruction fetch pipeline.

Next, in cycle 8, IFA A advances to the branch scan stage and, in the absence of a BTA prediction, the instruction cache is accessed (erroneously) with the sequential IFA A+20h. By this time enough history has been gathered to insert the first entry into BTAC 300 to associate IFA A with BTA A. Consequently, in cycle 9, BTAC correctly provides BTA A as the IFA. In cycle 9, the erroneous IFA A+20h also advances to the branch scan stage, and IFA A advances to the branch prediction stage.

Next, in cycle 10, IFA B is computed, and erroneous IFA A+20h is canceled from the instruction fetch pipeline. However, the correct IFA A provided by BTAC 300 is also canceled (or "squashed") in the cancellation of the preceding erroneous IFA A+20h. Unfortunately, given the specified tight loop structure of the code, the erroneous cancellation of correct BTAC predictions for both IFA A and IFA B is repeated in like manner in cycles 12 and 15. As can thus been seen, for particular loop patterns, the benefit of the BTAC is diminished or negated as correct BTAs predicted by the BTAC are squashed in the cancellation from the instruction fetch pipeline of erroneous sequential IFAs.

Figure 4:
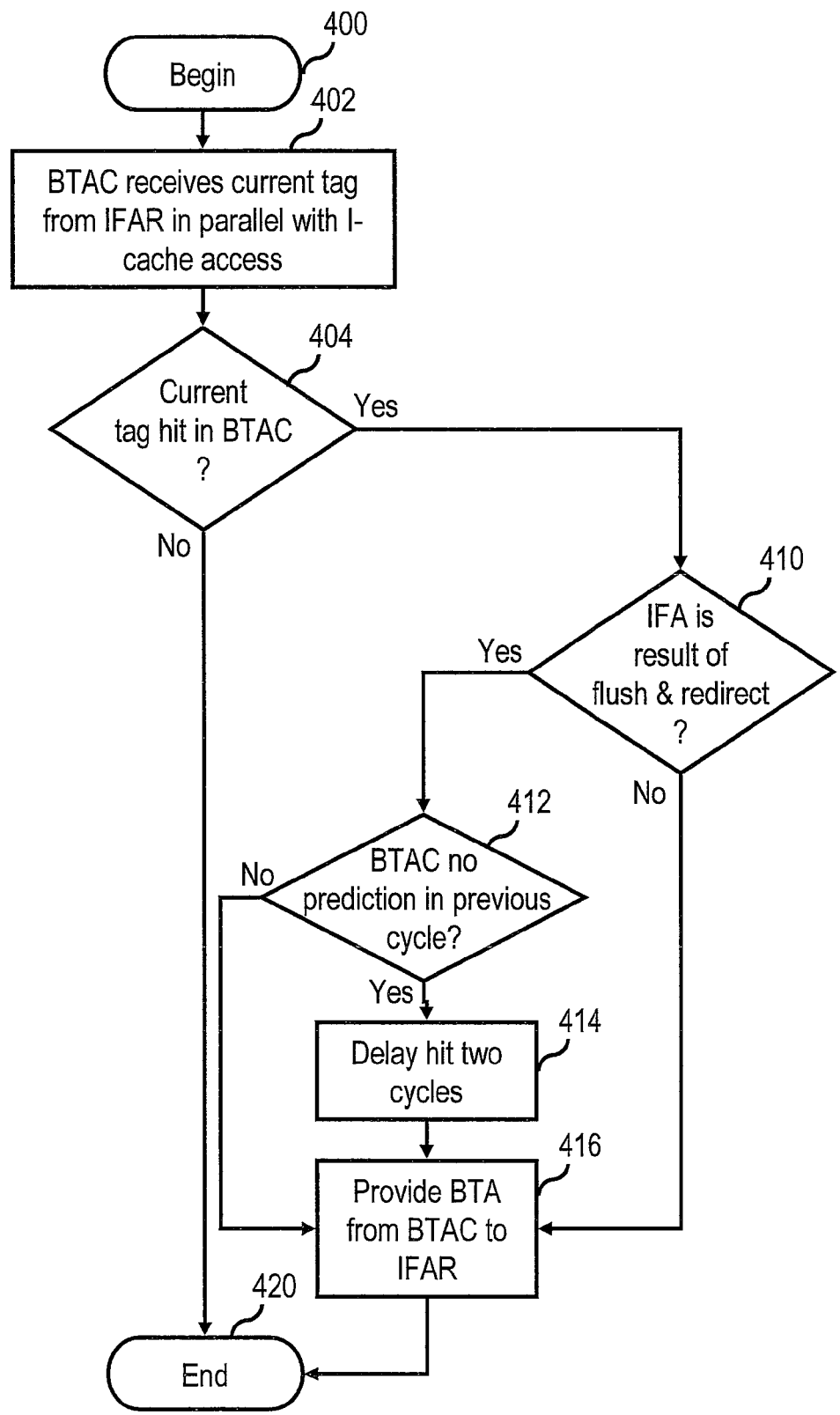
FIG. 4 is a high level logical flowchart of an exemplary method by which a Branch Target Address Cache (BTAC) generates instruction fetch addresses and selectively applies a delay to a branch target address obtained from a BTAC hit in accordance with the present invention.

In at least some embodiments, the inefficiency arising from the cancellation of correctly predicted BTAs is avoided by delaying the effects of a BTAC hit for two cycles if the BTA represents a flush and a redirect and no BTAC predication was made in the previous processor cycle. A high level logical flowchart of an exemplary method by which BTAC 132 generates and outputs speculative branch target addresses (BTAs) and appropriately delays certain BTAs to avoid the BTAs being squashed in the cancellation of erroneous sequential IFAs is illustrated in FIG. 4. As a logical flowchart, it will be appreciated that in at least some embodiments of the process depicted in FIG. 4 at least some of the illustrated steps can be performed concurrently and/or in a different order than that shown.

The process of FIG. 4 begins at block 400 and then proceeds to block 402, which illustrates BTAC 132 receiving the tag 162 of the instruction fetch address (IFA) in IFAR 30 concurrently with the transmission of the IFA to L1 I-cache 18 to initiate a fetch of an instruction block. In response to receipt of tag 162 by BTAC 132, BTAC array 140 is accessed concurrently with the I-cache access in order to determine at block 404 if tag 162 hits in an entry 142, that is, whether the tag 162 matches the contents of any of tag fields 144 of entries 142.

If not, the process terminates at block 420. However, if the tag 162 hits in BTAC array 140 (and the resulting hit signal 152 is successfully qualified by the contents of the state field 148 of the matching entry 142), the process proceeds from block 404 to blocks 410 and 412. Blocks 410 and 412 represent delay logic 150 determining whether the IFA was selected as the result of the misprediction of the immediately previous branch prediction (meaning that BHT 130 or BEU 92 had to flush at least a mispredicted instruction fetch block) and BTAC array 140 did not have a prediction in the preceding cycle. In response to a negative determination at either block 410 or block 412, delay logic 150 does not implement any delay, and the BTA output by BTAC array 140 is furnished to IFAR 30 for selection as the IFA. If, however, delay logic 150 makes a positive determination at both of blocks 410 and 412, delay logic 150 applies a two-cycle delay to the BTA output by BTAC array 140 prior to its presentation to IFAR 30. In this manner, correct BTAs output by BTAC array 140 are protected from being squashed in the cancellation of erroneously sequential IFAs. Following block 416, the process illustrated in FIG. 4 terminates at block 420 until a next tag 162 is received by BTAC 132.

Referring now to FIG. 5B, a chart summarizing the processing of the exemplary instruction fetch address sequence A, B, A, B, etc. in a processor 8 employing a 2-cycle BTAC 140 in accordance with the present invention is illustrated. Like the chart provided in FIG. 3B, the chart depicts progress of IFAs through the stages of the instruction fetch pipeline, namely, instruction cache access (ICA) of L1 I-cache 18, branch scan (BScan) by instruction decoder 128, and branch prediction (BPred) by BTAC 132, for 15 processor clock cycles.

As can be seen by comparison of FIG. 5B with FIG. 3B, the operation of the processor 8 in cycles 1-8 prior to the establishment of the BTA predictions in BTAC array 140 is identical to that for the prior art processor described above. In cycle 8, the branch target address prediction for IFA A is established in BTAC array 140 as shown in FIG. 5A. Consequently, when IFA A advances to the branch prediction stage in cycle 9, a hit occurs in BTAC array 140 for IFA A, causing BTAC array 140 to output the BTA A. However, as described above with reference to FIG. 4, delay logic 150 delays the output of BTA A by BTAC 132 for 2 cycles (i.e., until cycle 11). Consequently, a "bubble" (i.e., the absence of an IFA) is inserted into the instruction fetch pipeline at cycle 9 in lieu of an IFA.

In cycle 10, the IFA B is computed, leading to the insertion in BTAC array 140 in cycle 11 of the branch target address prediction for IFA B in BTAC array 140, as shown in FIG. 5A. In response to the computation of IFA B, branch logic 36 also cancels erroneous sequential fetch address A+20h from the instruction fetch pipeline, as depicted in FIG. 5B. However, the cancellation of the erroneous sequential IFA does not squash the correct branch target address prediction (i.e., IFA A) due to the 2-cycle delay imposed by delay logic 150. Thus, in cycle 11, delay logic 150 supplies IFA A obtained in cycle 9 to IFAR 30 in order to initiate a correct instruction fetch. BTAC array 140 experiences a hit in each subsequent processor cycle, leading to correct prediction of addresses B, A, B, A, etc.

As can thus be seen, the application of an appropriate delay by delay logic 150 when a flush and redirect follows a cycle in which no branch target address prediction is made ensures that a correct branch target address prediction is not squashed in the cancellation of an erroneous sequential IFA.

Figure 6:
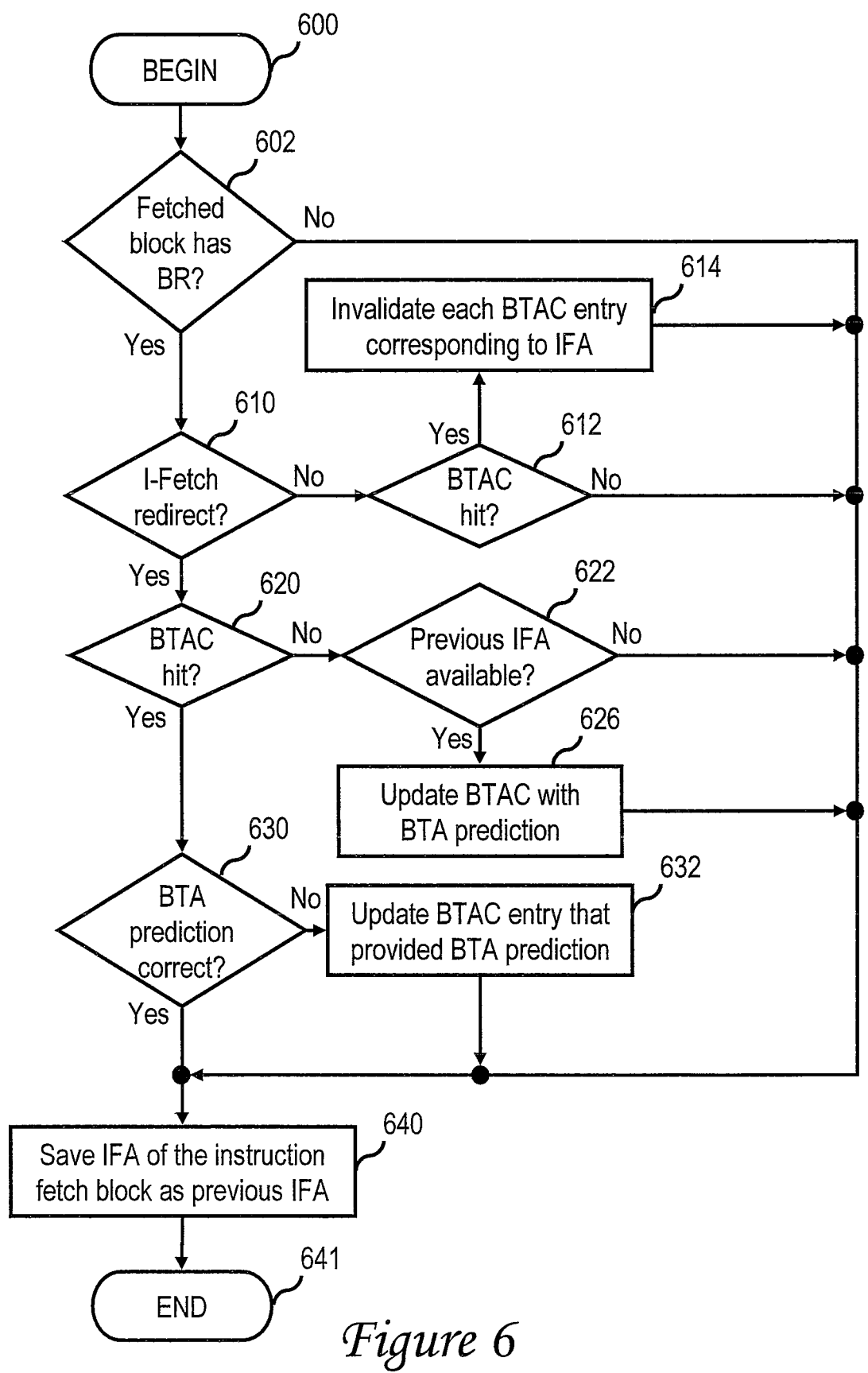
FIG. 6 is a high level logical flowchart of an exemplary method by which the branch target address predictions within the BTAC are updated by branch logic in accordance with the present invention.

Referring now to FIG. 6, there is illustrated a high level logical flowchart that depicts an exemplary method by which the branch target address predictions within BTAC 132 are updated in accordance with the present invention. The process begins at block 600 of FIG. 6 and then passes to block 602, which depicts branch logic 36 determining whether or not a block of instructions (e.g., a 32-byte cache line) fetched from L1 I-cache 18 includes a branch instruction. If not, no update to BTAC 36 is made. The process shown in FIG. 6 therefore passes from block 602 to block 640, which depicts branch logic 36 saving the IFA of the instruction fetch block as the previous IFA within historical IFA buffer 160 at block 640. The process thereafter terminates at block 641 until a subsequent instruction block is fetched.

Returning to block 602, if branch logic 36 determines at block 602 that the fetched instruction block includes a branch instruction, the process proceeds to block 610. Block 610 depicts branch logic 36 determining whether the fetched instruction block contains an unconditional taken branch or a conditional branch predicted as "taken" by BHT 130. If so, the process proceeds from block 610 to block 620, which is described below. If not, the process passes to block 612, which depicts branch logic 36 determining from hit signal 152 whether the tag 162 of the IFA hit in BTAC array 140. If not, no update to BTAC 132 is made, and the process passes from block 612 to blocks 640-641, which have been described. If, however, a determination is made at block 612 that tag 162 hits in BTAC array 140, meaning that BTAC 132 has at least one entry predicting a redirect target address for a fetched instruction block containing no branch that would cause a fetch redirect, branch logic 36 invalidates the entry 142 in BTAC array 140 matching tag 162 (block 614). Such invalidation may be performed, for example, by updating the state field of the relevant entry 142. Thereafter, the process passes to blocks 640-641, which have been described.

Referring now to block 620, if branch logic 36 determines that a branch instruction within the fetched instruction block was either unconditionally "taken" or predicted as "taken" and tag 162 hit in BTAC array 140, the process proceeds to block 630, which is described below. If, however, branch logic 36 determines at block 620 that a branch instruction within the fetched instruction block was "taken" and tag 162 missed in BTAC array 140, the process proceeds to block 622. Block 622 illustrates branch logic 36 determining whether historical IFA buffer 160 buffers the previous IFA immediately preceding the IFA that generated the fetch of the instruction block containing the taken branch instruction in question. IFA buffer 160 may not buffer the IFA for a number of reasons, for example, a reboot of the machine, a context switch, or a pipeline flush.

If branch logic 36 determines at block 622 that the previous IFA is not available, no entry 142 is inserted in BTAC array 140, and the process proceeds to blocks 640-641, which have been described. If, on the other hand, branch logic 36 determines at block 622 that historical IFA buffer 160 retains the previous IFA immediately preceding the current IFA that generated the fetch of the instruction block containing the conditional branch instruction in question, branch logic 36 inserts within BTAC array 140 a new entry 142 containing the tag portion of the previous IFA in tag field 144 and the branch target address predicted by BHT 130 in BTA field 146. Following block 626, the process passes to blocks 640-641, which have been described.

With reference now to block 630, if branch logic 36 determines that the fetched instruction block contains a taken branch and tag 162 hit in BTAC 132, branch logic 36 further determines whether the BTA prediction is confirmed as correct by BHT 130. If so, no update to BTAC 132 is required, and the process proceeds to blocks 640-641, which have been described. If, however, BHT 130 indicates at block 630 that the BTA predicted by BTAC array 140 was incorrect, branch logic 36 updates the BTA field 146 of the entry 142 that provided the incorrect BTA prediction with the correct BTA. Thereafter, the process proceeds to blocks 640-641, which have been described.

As has been described, the present invention provides a data processing system, processor and method of data processing in which an improved branch target address cache (BTAC) is utilized to generate branch target address predictions. According to at least some embodiments, the BTAC delays an instruction fetch resulting from a BTAC hit for two cycles if the instruction fetch is the result of a flush and a redirect and no branch target address was predicted in the previous cycle.

While the invention has been particularly shown as described with reference to a preferred embodiment, it will be understood by those skilled in the art that various changes in form and detail may be made therein without departing from the spirit and scope of the invention.

What is claimed is:

1. A processor, comprising:

at least one execution unit that executes instructions; and instruction sequencing logic, coupled to the at least one execution unit, that fetches instructions from a memory system for execution by the at least one execution unit, said instruction sequencing logic including branch target address prediction circuitry that stores a branch target address prediction associating a first instruction fetch address with a branch target address to be used as a second instruction fetch address, wherein said branch target address prediction circuitry includes delay logic that, in response to at least a tag portion of a third instruction fetch address matching the first instruction fetch address, delays access to the memory system utilizing the second instruction fetch address if no branch target address prediction was made in an immediately previous cycle of operation of the branch target address prediction circuitry.

2. The processor of claim 1, wherein the delay logic delays access to the memory system for a two-cycle interval.

3. The processor of claim 1, wherein said branch target address prediction circuitry comprises a branch target address cache (BTAC).

4. The processor of claim 1, wherein said delay logic delays access to the memory system only if an erroneous sequential instruction fetch address was utilized to access the memory system in the immediately previous cycle of operation.

5. The processor of claim 1, wherein:

the branch logic includes a buffer that holds at least one previous instruction fetch address; and the branch logic inserts an entry based upon availability in the buffer of a particular previous instruction fetch address corresponding to the new branch target address prediction.

6. The processor of claim 1, wherein:

the memory system includes a cache memory within the processor; and the instruction sequencing logic accesses the branch target address prediction logic and the cache memory concurrently with the first instruction fetch address.

7. A data processing system, comprising:

at least one processor in accordance with claim 1;

an interconnect coupled to the processor; and the memory system coupled to the processor via the interconnect and operable to communicate data with the at least one processor.

8. A method of data processing in a processor including at least one execution unit and an instruction sequencing logic containing branch target address prediction circuitry, said method comprising:

in the branch target address prediction circuitry, storing a branch target address prediction associating a first instruction fetch address with a branch target address to be used as a second instruction fetch address, fetching instructions from a memory system for execution by at least one execution unit of the processor;

accessing the branch target address prediction with at least a tag portion of a third instruction fetch address; and in response to a third instruction fetch address matching the first instruction fetch address, delaying output of the second instruction fetch address if no branch target address prediction was made in an immediately previous cycle of operation of the branch target address prediction circuitry; and thereafter, outputting the second instruction fetch address to invoke fetching of instructions from the memory system.

9. The method of claim 8, wherein the delaying comprises delaying for an interval of two cycles.

10. The method of claim 8, wherein said branch target address prediction circuitry comprises a branch target address cache (BTAC).

11. The method of claim 8, wherein the delaying comprises delaying only if an erroneous sequential instruction fetch address was utilized to access the memory system in the immediately previous cycle of operation.

12. The method of claim 8, wherein:

the branch logic includes a buffer that holds at least one previous instruction fetch address; and said inserting comprises the branch logic an entry based upon availability in the buffer of a particular previous instruction fetch address corresponding to the new branch target address prediction.

13. The method of claim 8, wherein:

said memory system includes a cache memory; and said accessing comprises the instruction sequencing logic accessing the branch target address prediction circuitry and a cache memory concurrently with the first instruction fetch address.

* * * * *